Oct. 23, 1928.
E. H. McCLOUD
1,689,076
BUMPER
Filed March 5, 1928
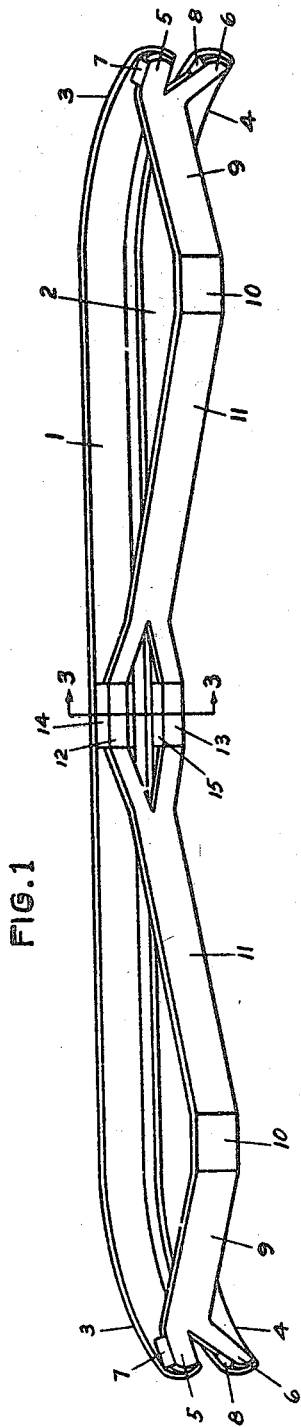
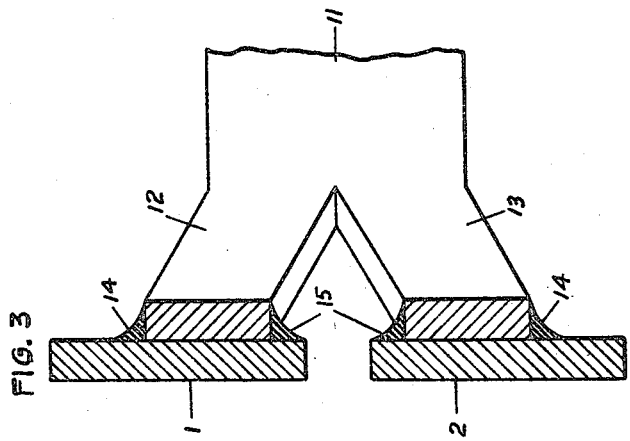
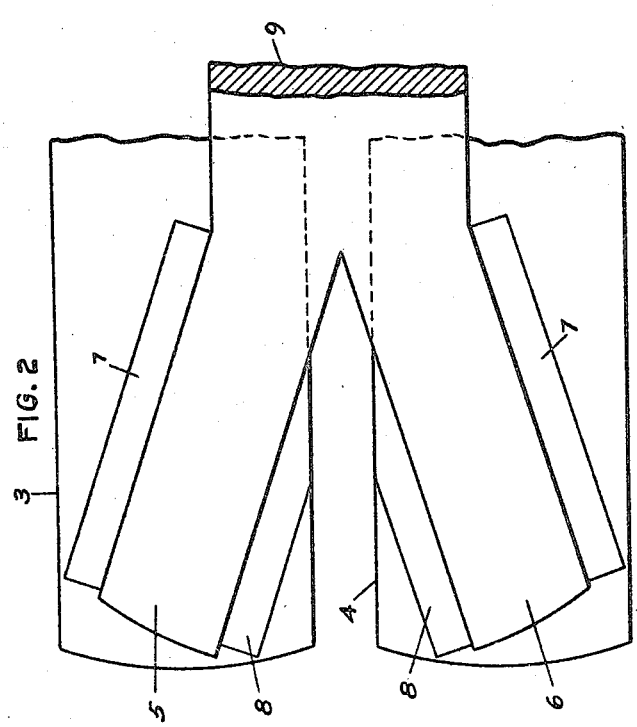
INVENTOR
EDWARD H. McCLOUD
BY Toulmin & Toulmin
ATTORNEYS Patented Oct. 23, 1928.

1,689,076

UNITED STATES PATENT OFFICE.

EDWARD H. McCLOUD, OF COLUMBUS, OHIO, ASSIGNOR TO THE CENTRAL BRASS AND FIXTURE COMPANY, OF SPRINGFIELD, OHIO, A CORPORATION OF OHIO.

BUMPER.

Application filed March 5, 1928. Serial No. 259,061.

My invention relates to bumpers.

It is the object of my invention to provide an integral one-piece bumper structure consisting of a bumper bar or bumper bars joined together by a truss-like supporting bar without the use of connecting and spacing plates, bolts and the like.

It is my object to provide a very strong, bifurcated end structure for spacing and supporting the bumper bars and a truss-like bridge structure, integrally attached to a weld as a part of the central portion of the bumper bars formed at the supporting bar.

Referring to the drawings—

Figure 1 is a rear perspective of the supporting bar and bumper bars.

Figure 2 is an enlarged rear elevation of the means and method of attachment of the bifurcated ends of the supporting bar and the bumper bars.

Figure 3 is a section on the line 3—3 of Figure 1, looking in the direction of the arrows.

Referring to the drawings in detail, 1 and 2 are bumper bars arranged in spaced relationship, with their outer ends 3 and 4 turned rearwardly. These outer ends are engaged by a supporting bar which has rearwardly turned and bifurcated ends 5 and 6 engaging the rear walls of the ends 3 and 4 of the bumper bars, to which the bifurcated ends 5 and 6 are welded by the welds 7 and 8 on the top and bottom edges of the bifurcated ends 5 and 6 on the rear surfaces of the ends 3 and 4 of the bumper bars 1 and 2. These bifurcated ends 5 and 6 are carried by a forwardly extending portion 9 of the supporting plate which is connected to a flat, intermediate plate 10 serving as the attaching portion of the supporting bar to the vehicle. On the other side of this portion 10 is a forwardly extending plate 11 that terminates in centrally arranged, bifurcated, spaced arms 12 and 13 which are welded by the welds 14 and 15 on the upper and lower edges thereof to the rear faces of the bumper bars 1 and 2.

By reason of the maximum spacing between the bumper bars 1 and 2 and the point of attachment at the plate 10 to the vehicle of the supporting bar, a truss-like structure is formed which is of sufficient resiliency to take and accommodate any shock on the bumper without injuring the vehicle, and to permit of sufficient collapse by reason of the bending of the arcuate ends 3 of the bumper bars 1 and 2 to give to the shock and properly accommodate it and absorb it.

It is to be understood that I desire to comprehend within my invention such modifications as may be desirable within the scope of my claims to adapt the invention to varying conditions of use.

Having thus fully described my invention, what I claim is new and desire to secure by Letters Patent, is:

1. In a bumper, spaced bumper bars and a supporting bar having bifurcated ends attached to the end thereof.

2. In a bumper, spaced bumper bars and a supporting bar having bifurcated ends attached thereto, and a bifurcated central portion attached thereto.

3. In a bumper, spaced bumper bars and an overlapping supporting bar having bifurcated ends attached to the ends of the bumper bars by welding.

4. In a bumper, spaced bumper bars and a supporting bar having bifurcated ends, welds for attaching said ends to said bumper bars adjacent their ends to support them in spaced relationship, and a forwardly extending central portion of the supporting bar integrally attached to the central portions of the bumper bars.

5. In a bumper, spaced bumper bars and a supporting bar having bifurcated ends, welds for attaching said ends to said bumper bars adjacent their ends to support them in spaced relationship, and a forwardly extending central portion of the supporting bar integrally attached to the central portions of the bumper bars, said central portion of the supporting bar being attached on the rear faces of the bumper bars.

6. In a bumper, spaced bumper bars and a supporting bar having bifurcated ends, welds for attaching said ends to said bumper bars adjacent their ends to support them in spaced relationship and a forwardly extending central portion of the supporting bar integrally attached to the central portions of the bumper bars, said central portion of the supporting bar being attached on the rear faces of the bumper bars and being bifurcated for this purpose so that each portion of the bifurcated structure of the supporting bar is attached to its respective bumper bar.

7. In combination, spaced bumper bars and a supporting bar having bifurcated ends and a bifurcated central portion, the portions of the supporting bar being spaced from the bumper bars intermediate the ends and center of the supporting bar, said ends and center of the supporting bar being integrally attached to the bumper bars.

8. In combination, spaced bumper bars and a supporting bar having bifurcated ends and a bifurcated central portion, the portions of the supporting bar being spaced from the bumper bars intermediate the ends and center of the supporting bar, said ends and center of the supporting bar being integrally attached to the bumper bars by welding.

9. In a means of attaching a supporting bar to spaced bumper bars, said supporting bar having bifurcated ends overlapping the ends of spaced bumper bars on the upper and lower edges of the bifurcated ends of the supporting bar adjacent the rear faces of the bumper bars.

10. In a bumper, spaced bumper bars having their ends curved rearwardly, a supporting bar having bifurcated ends welded to the bumper bars, and a bifurcated central portion welded to the central portion of the bumper bars, said bars being otherwise spaced from one another.

In testimony whereof, I affix my signature.

EDWARD H. McCLOUD.